US009701240B2

(12) United States Patent
Matsumaru et al.

(10) Patent No.: US 9,701,240 B2
(45) Date of Patent: Jul. 11, 2017

(54) VEHICLE LIGHTING UNIT HAVING LIGHT GUIDING LENS

(71) Applicant: Stanley Electric Co., Ltd., Tokyo (JP)

(72) Inventors: Takuya Matsumaru, Tokyo (JP); Kazuya Marugame, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 104 days.

(21) Appl. No.: 14/745,418

(22) Filed: Jun. 20, 2015

(65) Prior Publication Data

US 2015/0367773 A1 Dec. 24, 2015

(30) Foreign Application Priority Data

Jun. 20, 2014 (JP) .................................. 2014-126967

(51) Int. Cl.
*F21V 3/04* (2006.01)
*B60Q 1/30* (2006.01)
(Continued)

(52) U.S. Cl.
CPC ........... *B60Q 1/302* (2013.01); *B60Q 1/2619* (2013.01); *B60Q 1/2696* (2013.01);
(Continued)

(58) Field of Classification Search
CPC .......... F21V 5/045; F21V 5/02; F21V 7/0033; F21V 3/04; F21S 4/28; F21S 48/225; F21S 48/24
See application file for complete search history.

(56) References Cited

U.S. PATENT DOCUMENTS 6,547,423 B2 * 4/2003 Marshall ................... F21V 5/04
257/E33.072
7,207,700 B2 * 4/2007 Fallahi ................ F21S 48/2212
362/334

(Continued)

FOREIGN PATENT DOCUMENTS

EP 2 479 486 A2 7/2012
EP 2 693 105 A2 2/2014
(Continued)

OTHER PUBLICATIONS

The extended European Search Report for the related European Patent Application No. 15172702.1 dated Oct. 21, 2015.

*Primary Examiner* — Ismael Negron
(74) *Attorney, Agent, or Firm* — Kenealy Vaidya LLP

(57) ABSTRACT

A unit has at least one light emitting diode (LED), a light-guiding lens in front of the LED, a downwardly inclined transparent window disposed in front of the light guiding lens, and light-shielding coatings disposed on a surface of the transparent window facing the light guiding lens, above and below the front face of the light-guiding lens. The light-guiding lens includes a light incident portion; a first reflecting surface for upwardly reflecting light from an upper half of the light incident portion; second reflecting surfaces for laterally reflecting light from a lower half of the light incident portion; third reflecting surfaces for upwardly reflecting light from the second reflecting surfaces; a fourth reflecting surface for forwardly reflecting the light from the first and third reflecting surfaces; and a light exiting surface for projecting light from the fourth reflecting surface forward.

6 Claims, 7 Drawing Sheets

(51) Int. Cl.
    *F21S 8/10*     (2006.01)
    *G02B 19/00*     (2006.01)
    *B60Q 1/26*     (2006.01)
    *F21Y 115/10*     (2016.01)

(52) U.S. Cl.
    CPC ......... *F21S 48/215* (2013.01); *F21S 48/2212* (2013.01); *F21S 48/234* (2013.01); *F21S 48/236* (2013.01); *F21S 48/24* (2013.01); *G02B 19/0028* (2013.01); *G02B 19/0061* (2013.01); *F21Y 2115/10* (2016.08)

(56) References Cited

U.S. PATENT DOCUMENTS

| | | |
|---|---|---|
| 2005/0135109 A1 | 6/2005 | Stout |
| 2006/0061999 A1* | 3/2006 | Sommers ................. F21V 5/04 362/335 |
| 2011/0249462 A1 | 10/2011 | Koizumi et al. |
| 2015/0241616 A1* | 8/2015 | Bungenstock .......... F21S 48/00 362/511 |
| 2016/0084469 A1* | 3/2016 | Fukui ................... F21S 48/215 362/521 |

FOREIGN PATENT DOCUMENTS

| | | | | |
|---|---|---|---|---|
| JP | 2010-205606 A | | 9/2010 | |
| JP | 2010205606 A | * | 9/2010 | ............... F21S 8/10 |
| JP | 2011-222339 A | | 11/2011 | |
| JP | 2011222339 A | * | 11/2011 | ............... F21S 8/10 |

\* cited by examiner

Fig. 2
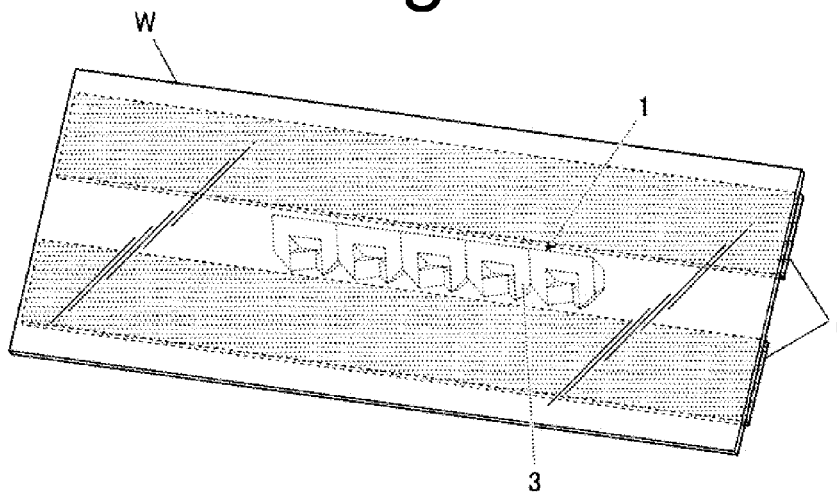
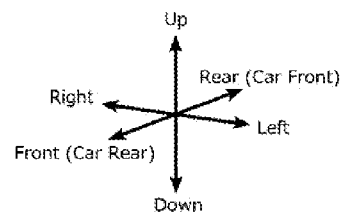
Fig. 3
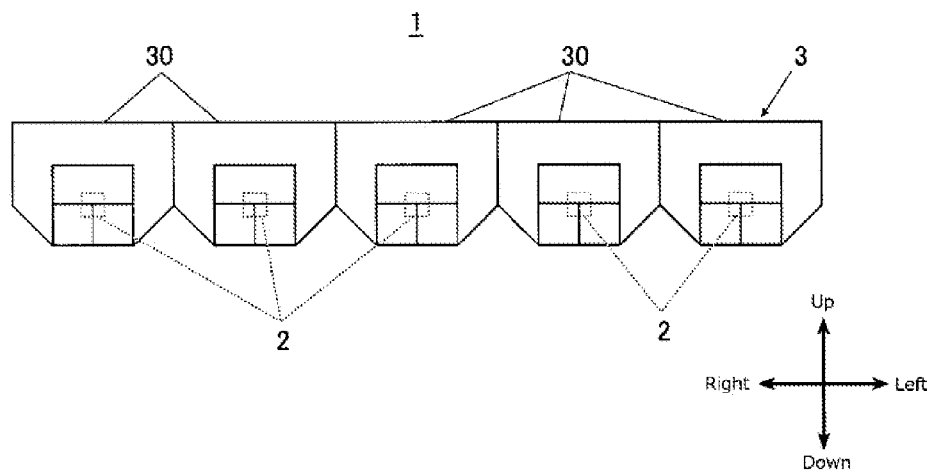

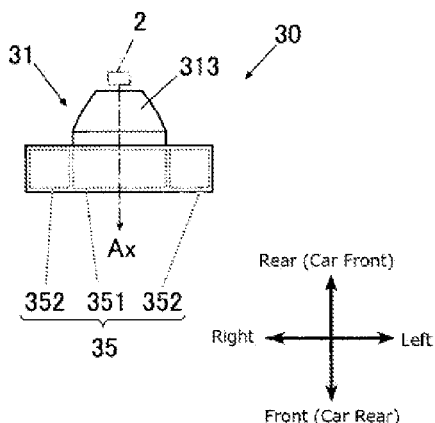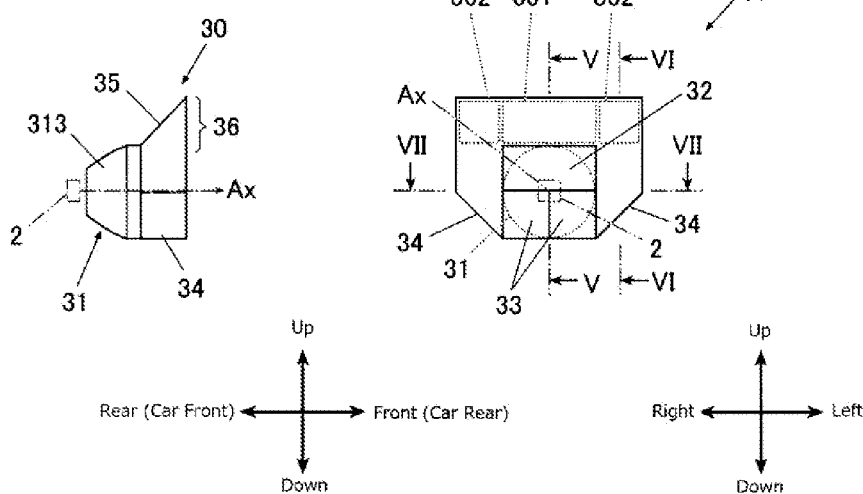

VEHICLE LIGHTING UNIT HAVING LIGHT GUIDING LENS

This application claims the priority benefit under 35 U.S.C. §119 of Japanese Patent Application No. 2014-126967 filed on Jun. 20, 2014, which is hereby incorporated in its entirety by reference.

TECHNICAL FIELD

The presently disclosed subject matter relates to a vehicle lighting unit, and in particular, to a vehicle lighting unit that can project light through a transparent plate inclined with respect to the front-to-rear direction of a vehicle body.

BACKGROUND ART

Some conventional vehicle lighting units to be mounted on a vehicle body have been known to project light through a transparent plate inclined with respect to the front-to-rear direction of the vehicle body. For example, a high-mount stop lamp to be mounted in a rear portion of a vehicle body can project light rearward through a glass car window (rear window) inclined downward toward its rear end with respect to the vehicle body.

On the other hand, vehicle lighting units that can control light emitted from a light source by means of a light-guiding lens disposed in front of the light source have been widely used to illuminate the front face of the light-guiding lens with light. The light-guiding lens of such a vehicle lighting unit can be formed symmetrical with respect to two directions (for example, a vertical direction and a horizontal direction) orthogonal to the optical axis of the light source with the optical axis as a symmetrical axis. As a result of this configuration, the light distribution thereof can be controlled to be symmetrical with respect to the two directions around the optical axis. Examples of this type vehicle lighting unit may include those described in Japanese Patent Application Laid-Open No. 2011-222339 (or US2011/0249462A2 corresponding thereto).

In a vehicle body incorporating this type of vehicle lighting unit, the transparent plate, or the rear car window, positioned in front of the vehicle lighting unit may be provided with a light-shielding member for concealing portions of the lighting unit other than the front face of the light-guiding lens, which are portions unwanted to be seen from outside. Specifically, in a vehicle body incorporating a high-mount stop lamp, portions of a car window above and below the portion thereof just in front of the light-guiding lens of the lamp may be provided with black ceramic light-shielding coating serving as a light-shielding member, as illustrated in FIG. 1.

However, suppose that such light-shielding members are provided to an inclined transparent plate (e.g., glass car window) in front of the lighting unit (e.g., high-mount stop lamp), and control of light distribution symmetrical with respect to the optical axis of the light source is performed by the light-guiding lens of the above-described conventional vehicle lighting unit. In this case, light that is slightly obliquely projected from the light-guiding lens and reaches the transparent plate at a position farther from the light-guiding lens to pass therethrough (in a high-mount stop lamp, the light travelling at lower side as illustrated in FIG. 1) may be partly shielded by the light-shielding member (e.g., black ceramic light-shielding coating), so that the amount of light tends to be reduced by the amount shielded by the light-shielding member. Further, the amount of light on that side may fundamentally tend to be reduced because the length of light path within the transparent plate may be lengthened more than that at the other side due to the incident angle with respect to the transparent plate.

In particular, in a high-mount stop lamp, since the required light intensity in a 5D direction from the lamp (a direction downward by 5 degrees from the horizontal level) is regulated by a certain law, if the light in the 5D direction is shielded by the light-shielding coating, the automobiles with the resulting high-mount stop lamp may not satisfy the regulation.

SUMMARY

The presently disclosed subject matter was devised in view of these and other problems and features in association with the conventional art. According to an aspect of the presently disclosed subject matter, a vehicle lighting unit configured to be disposed in front of a transparent plate inclined with respect to a front-to-rear direction of a vehicle body can appropriately project light, which has been conventionally directed to the relatively farther side of the transparent plate, by appropriately being guided by an improved light-guiding lens without the light hindered by the light-shielding member.

According to another aspect of the presently disclosed subject matter, a vehicle lighting unit can include a light source having an optical axis extending forward along a front-to-rear direction of a vehicle body incorporating the vehicle lighting unit therein, and a light-guiding lens disposed in front of the light source. A transparent plate is disposed in front of the vehicle lighting unit, the transparent plate being inclined so as to be closer to the light-guiding lens toward one side of a first orthogonal direction orthogonal to the front-to-rear direction and provided with light-shielding members disposed on respective sides of a portion in the first orthogonal direction with the portion being in front of a front face of the light-guiding lens when viewed from its front side.

In this vehicle lighting unit, the light-guiding lens can include:
  a light incident portion provided at a position facing to the light source, the light incident portion configured to allow light emitted from the light source to be incident thereon while the light can be substantially made parallel with the front-to-rear direction;
  a first reflecting surface provided forward of a first half of the light incident portion on a first side of the first orthogonal direction, so that the first reflecting surface is configured to internally reflect the light emitted from the light source and having been incident on the first half of the light incident portion to the first side of the first orthogonal direction;
  a second reflecting surface provided forward of a second half of the light incident portion on a second side of the first orthogonal direction, so that the second reflecting surface is configured to internally reflect the light emitted from the light source and having been incident on the second half of the light incident portion in a second orthogonal direction orthogonal to the first orthogonal direction and the front-to-rear direction;
  a third reflecting surface provided in the second orthogonal direction with respect to the second reflecting surface, so that the third reflecting surface is configured to internally reflect the light having been internally reflected by the second reflecting surface to the first side of the first orthogonal direction;

a fourth reflecting surface provided in the first side of the first orthogonal direction with respect to the first reflecting surface and the third reflecting surface, so that the fourth reflecting surface is configured to internally reflect the light having been internally reflected by the first reflecting surface and the third reflecting surface forward; and a light exiting surface provided on the first side of the first orthogonal direction out of a front surface of the light-guiding lens and in front of the fourth reflecting surface, so that the light exiting surface is configured to allow the light having been internally reflected by the fourth reflecting surface to exit therethrough and directed forward.

In the vehicle lighting unit with the above-described configuration, the second reflecting surface is configured to be composed of two second reflecting surfaces formed to internally reflect the light having been incident on the second half of the light incident portion to both sides of the second orthogonal direction, and the third reflecting surface is configured to be composed of two third reflecting surfaces provided on both sides of the second orthogonal direction corresponding to the two second reflecting surfaces, respectively.

In the vehicle lighting unit with any of the above configurations, the first orthogonal direction may be a vertical direction (upper and lower directions) and the first side of the first orthogonal direction is an upper side. Further, the second orthogonal direction is a horizontal direction (left-to-right direction).

The vehicle lighting unit with any of the above configurations can be used as a high-mount stop lamp, which projects light rearward of the vehicle body, and the transparent plate can be a car window provided on a rear side of the vehicle body.

According to the presently disclosed subject matter, the light emitted forward from the light source can be incident on the light incident portion of the light-guiding lens while the light can be made parallel with the front-to-rear direction by the light incident portion. Among the incident light, the light incident on the first half (e.g., upper half) of the light incident portion on the first side (e.g., to the upper side) of the first orthogonal direction (e.g., vertical direction) orthogonal to the front-to-rear direction can be internally reflected by the first reflecting surface to the first side of the first orthogonal direction, and then can be internally reflected by the fourth reflecting surface forward to be projected forward through the light exiting surface. On the other hand, among the incident light, the light incident on the second half (e.g., lower half) of the light incident portion can be internally reflected by the second reflecting surface to the second orthogonal direction (e.g., to the horizontal direction) orthogonal to both the front-to-rear direction and the first orthogonal direction, and then can be internally reflected by the third reflecting surface to the first side (e.g., to the upper side) of the first orthogonal direction and further internally reflected by the fourth reflecting surface forward to be projected forward through the light exiting surface.

With this configuration, the light from the light source can be projected through the light exiting surface provided to the first side (e.g., to the upper side) of the first orthogonal direction that is the side of the front face of the light-guiding lens closer to the transparent plate disposed in front of the vehicle lighting unit. Therefore, the light projected from the light exiting surface slightly obliquely to the second side (e.g., to the lower side) of the first orthogonal direction may not be shielded by the light-shielding member (coating) provided to the transparent plate on the second side of the first orthogonal direction, and can appropriately pass through the transparent plate.

Accordingly, the light, which has been conventionally directed to the relatively farther side of the transparent plate, can pass through the transparent plate without shielded by the light-shielding member on the inclined transparent plate, so that the vehicle lighting unit can project light appropriately.

BRIEF DESCRIPTION OF DRAWINGS

These and other characteristics, features, and advantages of the presently disclosed subject matter will become clear from the following description with reference to the accompanying drawings, wherein:

FIG. 2 is a perspective view illustrating a vehicle lighting unit made in accordance with principles of the presently disclosed subject matter;

FIG. 3 is a front view of the vehicle lighting unit of FIG. 2;

FIGS. 5A, 5B, and 5C are a front view, a plan view, and a side view of the light-guiding part of the same, respectively;

DESCRIPTION OF EXEMPLARY EMBODIMENTS

Figure 1:
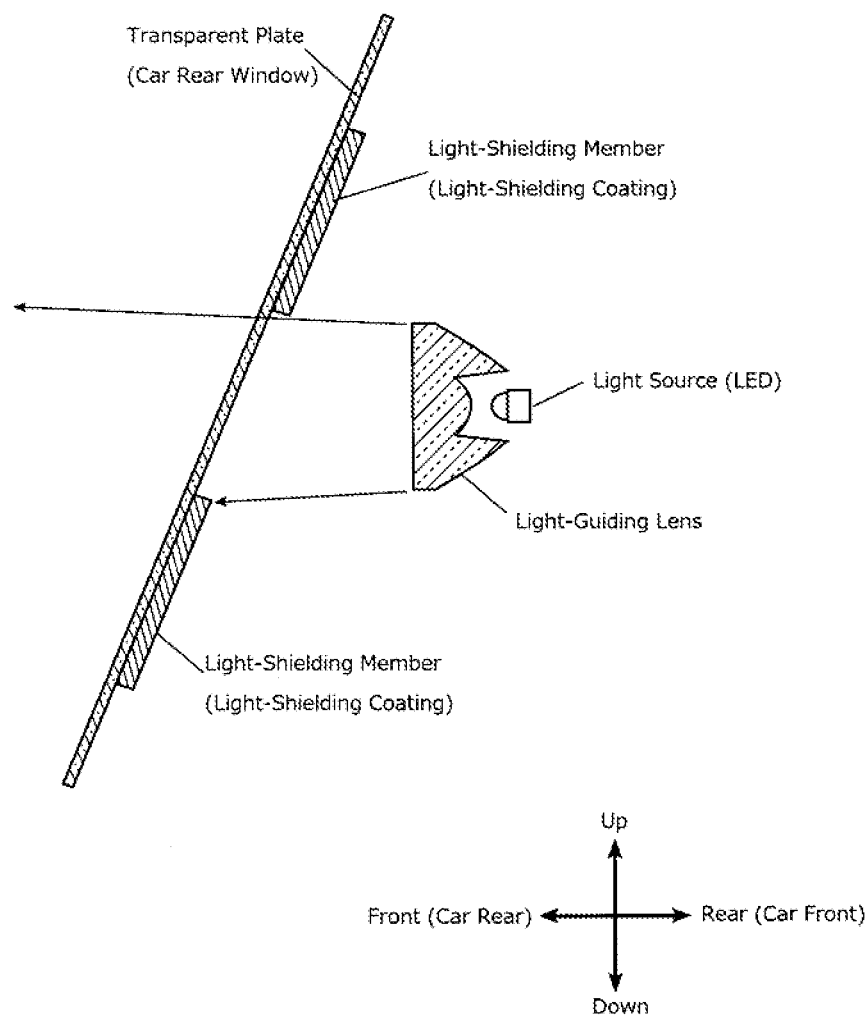
FIG. 1 is a cross-sectional view for illustrating an emission mode of a conventional vehicle lighting unit.

A description will now be made below to a vehicle lighting unit of the presently disclosed subject matter with reference to the accompanying drawings in accordance with exemplary embodiments.

In the specification, claims, and drawings, the "front (forward)," "back (rearward)," "left," "right," "upper (upward)," and "lower (downward)" directions means directions with respect to the light emission direction of the vehicle lighting unit, or optical axis of the vehicle lighting unit unless otherwise specified. Accordingly, even when the vehicle lighting unit is installed to a car rear window to be directed rearward, the front direction describing the vehicle lighting unit means the direction forward of the vehicle lighting unit as illustrated in the drawings. Note, however, that when the direction is described on the basis of the vehicle body (or car window), the direction may be described with reference to the vehicle body.

FIGS. 2 and 3 are a perspective view and a front view of a vehicle lighting unit 1 made in accordance with the principles of the presently disclosed subject matter. Note that FIG. 2 also shows a car window (transparent plate) W covering the front side of the vehicle lighting unit 1.

Figure 9:
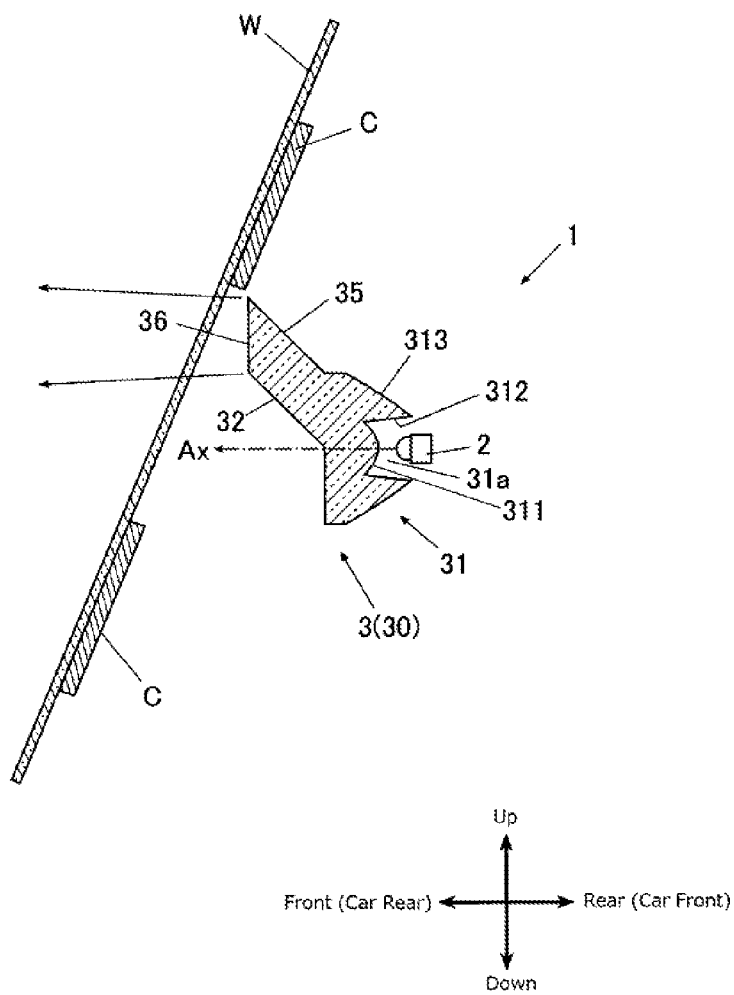
FIG. 9 is a cross-sectional view for illustrating an emission mode of the vehicle lighting unit.

As illustrated in FIGS. 2 and 3, the vehicle lighting unit 1 can be configured as a high-mount stop lamp to be installed in a rear portion of a not-illustrated vehicle body. The high-mount stop lamp, or the vehicle lighting unit 1, which can be disposed inside the vehicle body, can project light rearward through the car window W (rear window). As illustrated, the car window W can be inclined downward toward its rear edge with respect to the vehicle body, in other words with reference to the vehicle lighting unit 1, is inclined forward of the vehicle lighting unit 1. Furthermore, as illustrated, black ceramic light-shielding coatings C can be formed on both upper and lower sides of a portion of an inner surface of the car window W facing to the vehicle lighting unit 1 so that the unwanted areas can be concealed by the light-shielding coatings C. More specifically, the light-shielding coatings C can be disposed with a predetermined width on respective upper and lower sides of the portion of the car window W in front of a light-guiding lens 3 to be described later, so that only the front face of the light-guiding lens 3 can be exposed and observed through the portion of the car window W when viewed from the front side of the vehicle lighting unit 1. (See FIG. 9.)

Specifically, the vehicle lighting unit 1 can include a plurality of light-emitting diodes (LEDs) 2 serving as a light source, and a light-guiding lens 3 configured to control light emitted from the LEDs 2.

In this exemplary embodiment, the plurality of LEDs 2 can emit red light, and be directed forward and disposed at regular intervals in a horizontal direction while respective optical axes Ax are aligned in the front-to-rear direction.

The light-guiding lens 3 can be formed so as to be elongated horizontally and disposed in front of the plurality of LEDs 2. More specifically, the light-guiding lens 3 can be formed to include a plurality of light-guiding parts 30 corresponding to the plurality of LEDs 2 so that the plurality of light-guiding parts 30 are integrally coupled to each other in the horizontal direction, as illustrated in FIGS. 2 and 3.

Figure 4A:
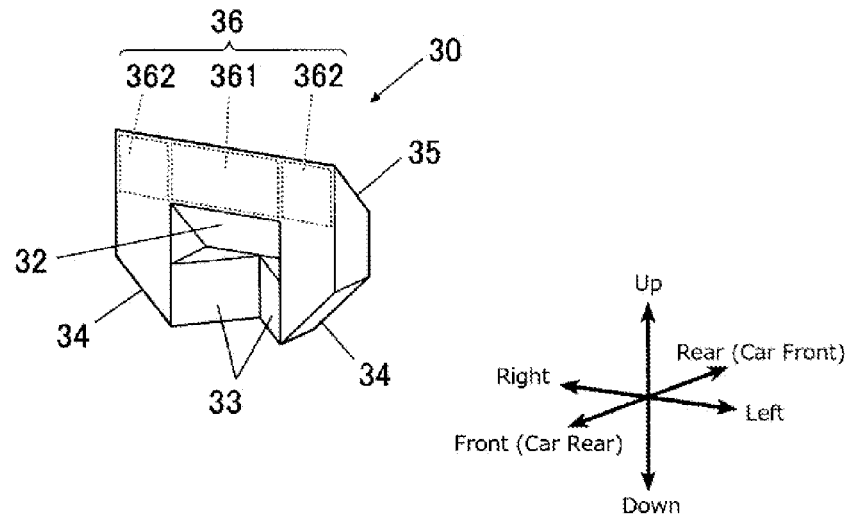
FIG. 4A is a perspective front view of a light-guiding part of the vehicle lighting unit in FIG. 2
Figure 4B:
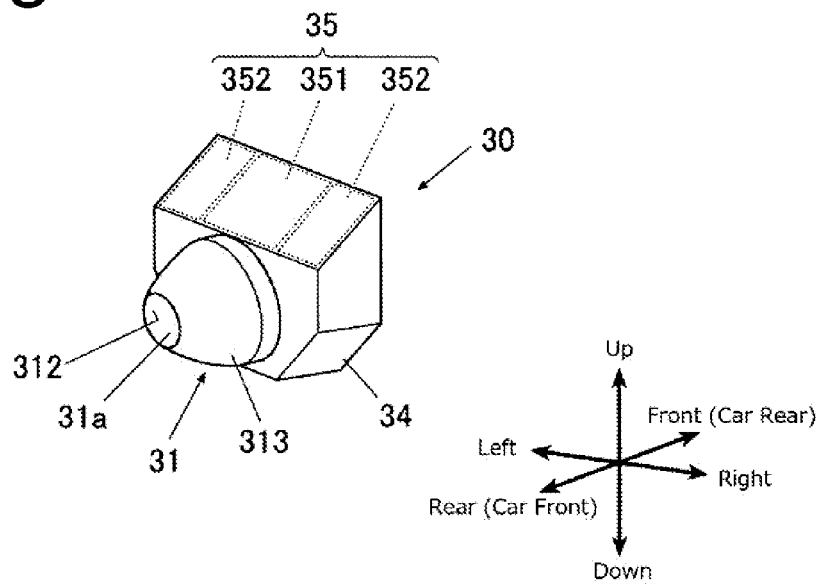
FIG. 4B is a perspective rear view of the light-guiding part of the same.
Figure 6:
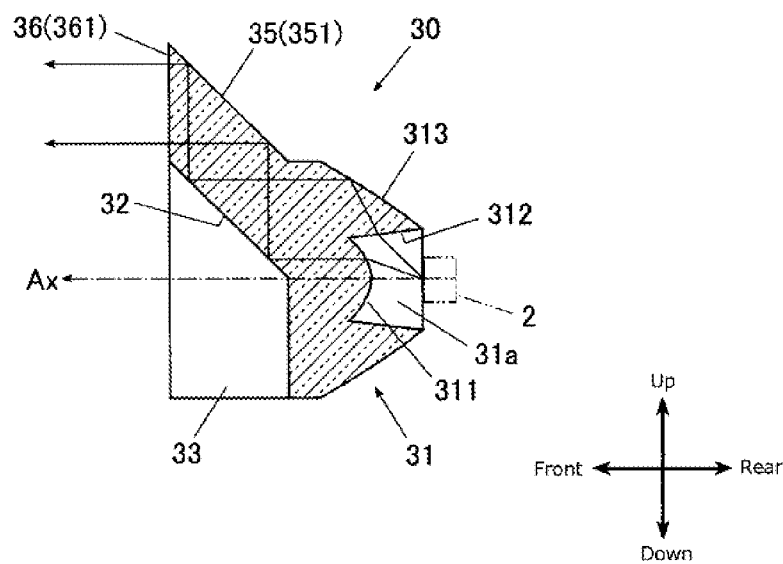
FIG. 6 is a cross-sectional view taken along line V-V in FIG. 5A.
Figure 7:
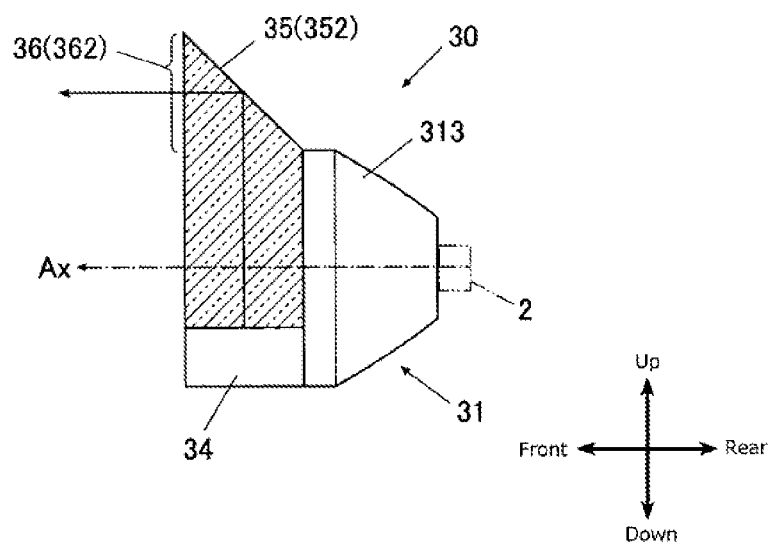
FIG. 7 is a cross-sectional view taken along line VI-VI in FIG. 5A.
Figure 8:
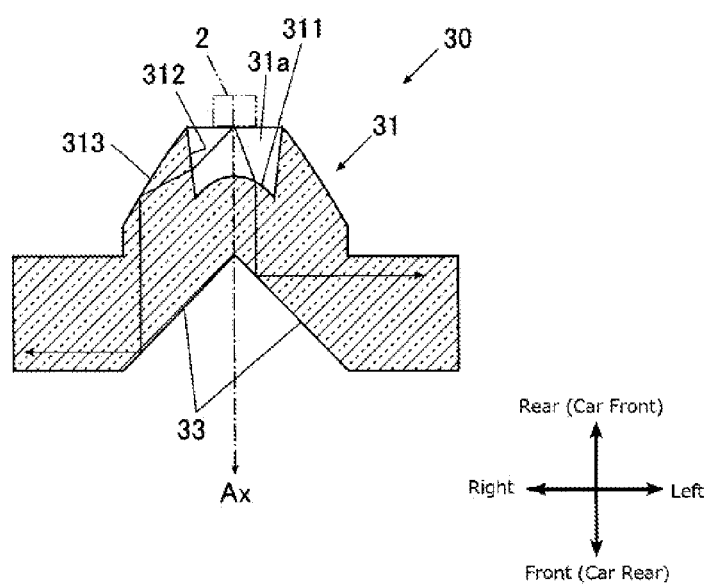
FIG. 8 is a cross-sectional view taken along line VII-VII in FIG. 5A.

FIG. 4A is a perspective front view of the light-guiding part 30 and FIG. 4B is a perspective rear view of the light-guiding part 30. FIGS. 5A, 5B, and 5C are a front view, a plan view, and a side view of the light-guiding part 30, respectively. FIG. 6 is a cross-sectional view taken along line V-V in FIG. 5A, FIG. 7 is a cross-sectional view taken along line VI-VI in FIG. 5A, and FIG. 8 is a cross-sectional view taken along line VII-VII in FIG. 5A.

As illustrated in these drawings, the light-guiding part 30 can be formed in a rectangular shape when viewed from its front side. Each of the light-guiding parts 30 can be disposed in front of the corresponding one of the LEDs 2. The light-guiding part 30 can include in its rear part a light incident portion 31 that allows light emitted from the corresponding LED 2 to be incident thereon and enter the light-guiding part 30.

Specifically, the light incident portion 31 can be formed in a lower, horizontally center end part of the rear part of the light-guiding part 30 so as to face to the corresponding LED 2 and have a truncated conical outer shape projected rearward with the optical axis AX of the LED 2 as a rotational symmetric axis thereof. Furthermore, the rear end of the light incident portion 31 can have an opening 31a opened rearward as can be seen from FIG. 6.

At the bottom of the opening 31a, a first incident surface 311 can be formed to be a convex surface projected rearward with the optical axis Ax as a rotational symmetric axis thereof while being made aspheric, and be positioned to face to the corresponding LED 2. The first incident surface 311 can have a focal point substantially at the location of the corresponding LED 2. With this configuration, light emitted forward from the corresponding LED 2 can be incident on the first incident surface 311 so as to enter the light-guiding part 30 as parallel light substantially along the optical axis Ax.

The inside of the opening 31a can further include an inner peripheral surface serving as a second incident surface 312. Specifically, the second incident surface 312 can be a substantially cylindrical surface extending from the peripheral edge of the first incident surface 311 rearward. The light emitted from the corresponding LED 2 and directed sideward more than that toward the first incident surface 311 can enter the light-guiding part 30 through the second incident surface 312.

The outside of the light incident portion 31 can include an outer peripheral surface serving as an incident-portion reflecting surface 313. The incident-portion reflecting surface 313 can be a truncated conical surface extending from the tip end (rear end) of the second incident surface 312 to the outer side (farther from the optical axis Ax) as illustrated in FIG. 6. The incident-portion reflecting surface 313 can be configured to internally reflect (totally reflect) light, which has entered the light-guiding part 30 through the second incident surface 312, substantially along the optical axis Ax.

With this configuration, the light incident portion 31 can allow the light emitted from the LED 2 to enter the light-guiding part 30 while the light can be made parallel substantially to the optical axis Ax and directed forward.

A portion of the front surface of the light-guiding part 30 just in front of the light incident portion 31 can be provided with a first reflecting surface 32 and two second reflecting surfaces 33 for reflecting the light guided from the light incident portion 31. The first reflecting surface 32 and the two second reflecting surfaces 33 can be formed to be recessed with respect to the other portion of the front surface of the light-guiding part 30 as can be seen from FIG. 4A.

The first reflecting surface 32 can be positioned forward of a first half, or an upper half, of the light incident portion 31. More specifically, as can be seen from FIG. 5A, the first reflecting surface 32 can be formed to be a rectangle circumscribed to the upper half of the front edge of the light incident portion 31 (semi-circle) when viewed from its front side with an upper side extending in the horizontal direction and right and left sides extending in the vertical direction, and a lower side extending in the horizontal direction and passing the optical axis Ax. The first reflecting surface 32 can be formed to be inclined by 45 degrees with respect to a plane perpendicular to the front-to-rear direction and positioned upward toward the front end thereof (see FIG. 6). The first reflecting surface 32 with this structure can internally reflect (totally reflect) the light, having entered through the upper half of the light incident portion 31 and travelled forward substantially along the optical axis Ax, upward.

The two second reflecting surfaces 33 can be positioned forward of a second half, or a lower half, of the light incident portion 31. More specifically, as can be seen from FIG. 5A, the two second reflecting surfaces 33 can be formed to be a rectangle circumscribed to the lower left or right half of the front edge of the light incident portion 31 when viewed from its front side with a lower side extending in the horizontal direction and right and left sides extending in the vertical direction, and an upper side extending in the horizontal direction and passing the optical axis Ax. The two second reflecting surfaces 33 can be a pair of right and left planes with a linear boundary extending in the vertical direction and passing through the intersection between the optical axis Ax and the lower edge of the first reflecting surface 32. Furthermore, the two second reflecting surfaces 33 can be formed to be inclined by 45 degrees with respect to a plane (which is perpendicular to the horizontal direction and includes the optical axis AX) leftward and rightward, respectively, and positioned forward toward the respective left and right ends thereof away from the optical axis Ax. As can be seen from FIG. 8, the two second reflecting surfaces 33 with this structure can internally reflect (totally reflect) the light, having entered through the lower half of the light incident portion 31 and travelled substantially along the optical axis Ax, rightward and leftward with respect to the optical axis Ax, respectively.

The light-guiding part 30 can further be provided with two third reflecting surfaces 34 disposed at lower end portions of the right and left side surfaces (see FIGS. 4A and 4B) so as to reflect the light having been reflected by the two second reflecting surfaces 33. The third reflecting surfaces 34 can be formed to be positioned outside the corresponding second reflecting surfaces 33 in the horizontal direction (away from the optical axis Ax), and further inclined by 45 degrees with respect to the plane (which is perpendicular to the horizontal direction and include the optical axis Ax) and positioned upward toward the respective left and right ends thereof away from the optical axis Ax. The two third reflecting surfaces 34 with this structure can internally reflect (totally reflect) the light, having been internally reflected by the respective second reflecting surfaces 33 leftward and rightward, upward (see FIG. 7).

The light-guiding part 30 can have a top surface serving as a fourth reflecting surface 35 that can further reflect the light having been reflected by the first reflecting surface 32 and the two third reflecting surfaces 34. The fourth reflecting surface 35 can be positioned above the first reflecting surface 32 and the two third reflecting surfaces 34 and be inclined by 45 degrees with respect to the plane perpendicular to the front-to-rear direction so as to be positioned upward toward the front end thereof. The fourth reflecting surface 35 with this structure can internally reflect (totally reflect) the light, having been internally reflected upward by the first reflecting surface 32 and the two third reflecting surfaces 34, forward.

Specifically, the fourth reflecting surface 35 can have a central portion 351 positioned just above the first reflecting surface 32. The central portion 351 can internally reflect the light, having been internally reflected upward by the first reflecting surface 32, forward. Furthermore, the fourth reflecting surface 35 can have two lateral portions 352 positioned on both sides of the central portion 351 and just above the two third reflecting surfaces 34, respectively. The two lateral portions 352 can internally reflect the light, having been internally reflected upward by the two third reflecting surfaces 34, forward.

Further, the fourth reflecting surface 35 may have a lower edge (rear edge) of which height is coincident with that of the upper edge (front edge) of the first reflecting surface 32, although the presently disclosed subject matter is not limited thereto.

The light-guiding part 30 can have an upper portion of the front surface serving as a light exiting surface 36 through which the light travelling through the light-guiding part 30 can exit. The light exiting surface 36 can be positioned in front of the fourth reflecting surface 35 (see FIGS. 6 and 7, for example) so as to allow the light having been internally reflected forward by the fourth reflecting surface 35 to exit therethrough and be directed forward.

More specifically, the light exiting surface 36 can be composed of a central portion 361 in front of the central portion 351 of the fourth reflecting surface 35 and lateral portions 362 in front of the lateral portions 352 of the fourth reflecting surface 35. The central portion 361 of the light exiting surface 36 can be configured to allow the light having been internally reflected forward by the central portion 351 of the fourth reflecting surface 35 to exit forward therethrough. The lateral portion 362 of the light exiting surface 36 can be configured to allow the light having been internally reflected forward by the lateral portions 352 of the fourth reflecting surface 35 to exit forward therethrough.

The vehicle lighting unit 1 with the above-described structure can be configured such that, when the plurality of LEDs 2 are turned on, the light emitted from each of the LEDs 2 can be projected forward through the corresponding one of the light-guiding parts 30 of the light-guiding lens 3.

Specifically, the light emitted from each of the LEDs 2 can enter the corresponding light-guiding part 30 (light-guiding lens 3) through the light incident portion 31 while becoming parallel light substantially with the optical axis Ax.

The light, having entered through the upper half of the light incident portion 31 and travelled forward substantially along the optical axis Ax, can be internally reflected by the first reflecting surface 32, a part of the front surface of the light-guiding part 30, upward, as illustrated in FIG. 6. Then, the light can be internally reflected by the central portion 351 of the fourth reflecting surface 35, which is disposed just above the first reflecting surface 32, forward, and be projected forward through the central portion 361 of the light exiting surface 36, which is disposed in front of the central portion 351.

In addition, the light, having entered through the lower half of the light incident portion 31 and travelled substantially along the optical axis Ax, can be internally reflected by the two second reflecting surfaces 33, parts of the front surface of the light-guiding part 30, rightward and leftward with respect to the optical axis Ax, respectively. Then, the divided parts of light can be internally reflected by the two third reflecting surfaces 34, both side surfaces of the light-guiding part 30, upward. The divided parts of light can further be internally reflected by the two lateral portions 352 of the fourth reflecting surface 35, which are disposed just above the two third reflecting surfaces 34 respectively, forward, and be projected forward through the lateral portions 362 of the light exiting surface 36, which are disposed in front of the respective lateral portions 352.

In this manner, in the respective light-guiding parts 30, the light emitted from the corresponding LEDs 2 can be projected through the upper front parts of the light exiting surfaces 36 that are positioned above the respective LEDs 2 in height. Accordingly, the light exiting through the light exiting surfaces 36 can be appropriately projected rearward of the vehicle body through the car window W without shielded by the light-shielding coating C provided on the lower side of the portion of the inclined car window W in front of the light-guiding part 30 (light-guiding lens 3).

As described above, according to the vehicle lighting unit 1 of the presently disclosed subject matter, the light emitted from each of the LEDs 2 can be projected forward through the light exiting surface 36 provided to the upper portion of the front surface of the light-guiding part 30 (light-guiding lens 3), which is the closer side of the light-guiding lens 3 to the car window positioned in front of the vehicle lighting unit 1. Accordingly, the light exiting through the light exiting surface 36 can be appropriately projected rearward of the vehicle body through the car window W without shielded by the light-shielding coating C provided on the lower side of the portion of the inclined car window W in front of the light-guiding lens 3.

Therefore, the light, which has been conventionally directed to the relatively farther lower side of the car window W, can be appropriately guided by the light-guiding lens 3 to the upper side and projected through the inclined car window W without hindered by the light-shielding coating C.

The above-described embodiment is only for the illustrative purpose and can be appropriately modified without departing from the scope of the presently disclosed subject matter.

The above-described embodiment has dealt with the vehicle lighting unit 1 as a high-mount stop lamp, but the vehicle lighting unit 1 according to the presently disclosed subject matter can be applied to any other lighting fixtures with a configuration in which an inclined transparent plate is disposed in front of the vehicle lighting unit and a light-shielding member is provided to the transparent plate. More specifically, the vehicle lighting unit according to the presently disclosed subject matter may be configured to be disposed in front of a transparent plate that is inclined to be closer to the light-guiding lens toward one direction perpendicular to the front-to-rear direction and has a light-shielding member provided to both sides of the portion just in front of the front surface of the light-guiding lens when viewed from its front side.

Furthermore, the light-guiding lens 3 can be formed to include the plurality of light-guiding parts 30 integrally formed, but may be formed to include a single light guiding part (a single light guiding part can serve as the light-guiding lens) according to the required design and specification as a lighting unit.

It will be apparent to those skilled in the art that various modifications and variations can be made in the presently disclosed subject matter without departing from the spirit or scope of the presently disclosed subject matter. Thus, it is intended that the presently disclosed subject matter cover the modifications and variations of the presently disclosed subject matter provided they come within the scope of the appended claims and their equivalents. All related art references described above are hereby incorporated in their entirety by reference.

What is claimed is:

1. A lighting unit configured to be mounted on a vehicle having a body defining a front-to-rear direction, the unit comprising:
    a light source having an optical axis extending forward along the front-to-rear direction;
    a light-guiding lens disposed in front of the light source;
    a transparent plate disposed in front of the light-guiding lens, the transparent plate being inclined so as to be closer to the light-guiding lens toward one side of a first direction orthogonal to the front-to-rear direction; and
    light-shielding members disposed on the transparent plate at respective sides of a portion in the first orthogonal direction in front of a front surface of the light-guiding lens when viewed from its front side, wherein
    the light-guiding lens includes:
        a light incident portion facing the light source, the light incident portion receiving light emitted from the light source and redirecting such light to be substantially parallel to the front-to-rear direction;
        a first reflecting surface provided forward of a first half of the light incident portion on a first side of the first orthogonal direction, so that the first reflecting surface internally reflects the light incident on the first half of the light incident portion to the first side of the first orthogonal direction;
        a second reflecting surface provided forward of a second half of the light incident portion on a second side of the first orthogonal direction, so that the second reflecting surface internally reflects the light incident on the second half of the light incident portion in a second orthogonal direction orthogonal to both the first orthogonal direction and the front-to-rear direction;
        a third reflecting surface provided in the second orthogonal direction with respect to the second reflecting surface, so that the third reflecting surface reflects the light internally reflected by the second reflecting surface to the first side of the first orthogonal direction
        a fourth reflecting surface provided in the first side of the first orthogonal direction with respect to the first reflecting surface and the third reflecting surface, so that the fourth reflecting surface internally reflect the light internally reflected by the first reflecting surface and the third reflecting surface forward; and
        a light exiting surface provided on the first side of the first orthogonal direction on the front surface of the light-guiding lens and in front of the fourth reflecting surface, so that the light exiting surface projects the light internally reflected by the fourth reflecting surface forward.

2. The vehicle lighting unit according to claim 1, wherein:
the first orthogonal direction is a vertical direction and the first side of the first orthogonal direction is an upper side; and
the second orthogonal direction is a horizontal direction.

3. The vehicle lighting unit according to claim 2, wherein:
the vehicle lighting unit is applied to a high-mount stop lamp, which projects light rearward of the vehicle body; and
the transparent plate is a car window provided on a rear side of the vehicle body.

4. The vehicle lighting unit according to claim 1, wherein:
the second reflecting surface includes two second reflecting surfaces to internally reflect the light having been incident on the second half of the light incident portion to both sides of the second orthogonal direction; and
the third reflecting surface includes two third reflecting surfaces provided on both sides of the second orthogonal direction corresponding to the two second reflecting surfaces, respectively.

5. The vehicle lighting unit according to claim 4, wherein:
the first orthogonal direction is a vertical direction and the first side of the first orthogonal direction is an upper side; and
the second orthogonal direction is a horizontal direction.

6. The vehicle lighting unit according to claim 5, wherein:
the vehicle lighting unit is applied to a high-mount stop lamp, which projects light rearward of the vehicle body; and
the transparent plate is a car window provided on a rear side of the vehicle body.

* * * * *